US010185307B2

(12) United States Patent
Olmino

(10) Patent No.: US 10,185,307 B2
(45) Date of Patent: Jan. 22, 2019

(54) METHOD OF AND SYSTEM FOR CONTROLLING MANUFACTURING PROCESSES IN DISCRETE PRODUCTION LINES

(71) Applicant: SIEMENS AKTIENGESELLSCHAFT, Munich (DE)

(72) Inventor: Paolo Olmino, Genua (IT)

(73) Assignee: Siemens Aktiengesellschaft, Munich (DE)

( * ) Notice: Subject to any disclaimer, the term of this patent is extended or adjusted under 35 U.S.C. 154(b) by 303 days.

(21) Appl. No.: 15/055,806

(22) Filed: Feb. 29, 2016

(65) Prior Publication Data
US 2016/0252899 A1 Sep. 1, 2016

(30) Foreign Application Priority Data

Feb. 27, 2015 (EP) ..................................... 15156885

(51) Int. Cl.
G05B 19/418 (2006.01)
(52) U.S. Cl.
CPC . G05B 19/41835 (2013.01); G05B 19/41845 (2013.01); G05B 19/41865 (2013.01);
(Continued)
(58) Field of Classification Search
CPC ........ G05B 19/41835; G05B 19/41845; G05B 19/41865; G05B 2219/31368; Y02P 90/16; Y02P 90/20; Y02P 90/12
See application file for complete search history.

(56) References Cited

U.S. PATENT DOCUMENTS 4,855,906 A 8/1989 Burke
7,395,131 B2 7/2008 Funk
(Continued)

FOREIGN PATENT DOCUMENTS

WO 2004019147 A2 3/2004

OTHER PUBLICATIONS

O'Neil, Elizabeth (Betty)., "Object/Relational Mapping 2008: Hibernate and the Entity Data Model (EDM)", Proceedings of the 2008 ACM SIGMOD International Conference on Management of Data (SIGMOD '08). ACM, New York, NY, USA, pp. 1351-1356.
(Continued)

Primary Examiner — Yasser A Abdelaziez
(74) Attorney, Agent, or Firm — Laurence Greenberg; Werner Stemer; Ralph Locher

(57) ABSTRACT

A method and a system control a discrete production line in a manufacturing plant employing a computer-managed MES system. The MES system contains a set of MES components interacting with one another in order to control different production phases, and the MES components use, for the control, data of MES entities stored in a database according to a first data model. The method includes: transforming data of MES entities shared among the MES components from the first data model into a second data model; providing a central cache for storing the shared data transformed into the second data model; providing a hub arranged to communicate with all MES components, the cache and the database; and during run time, making the MES components interact with one another and with the cache through the hub to control the production line.

12 Claims, 18 Drawing Sheets

(52) U.S. Cl.
CPC ..... *G05B 2219/31368* (2013.01); *Y02P 90/12* (2015.11); *Y02P 90/16* (2015.11); *Y02P 90/20* (2015.11)

(56) References Cited

U.S. PATENT DOCUMENTS

| | | | |
|---|---|---|---|
| 2005/0165731 A1* | 7/2005 | Funk | G05B 15/02 |
| 2006/0025880 A1* | 2/2006 | Chukka | G05B 19/41865 700/121 |
| 2008/0046568 A1 | 2/2008 | Broda et al. | |
| 2010/0318740 A1* | 12/2010 | Guerrasio | G06F 12/126 711/118 |

OTHER PUBLICATIONS

Cheng, Fan-Tien, et al., "Development of a system framework for the computer-integrated manufacturing execution system: A distributed object-oriented approach", International Journal of Computer Integrated Manufacturing, 1999, pp. 384-402, vol. 12, No. 5.

Agarwal, Shailesh, et al., "Architecting Object Applications for High Performance with Relational Databases", In OOPSLA Workshop on Object Database Behavior, Benchmarks, and Performance, 1995, pp. 1-8, Persistence Software, Inc.

* cited by examiner

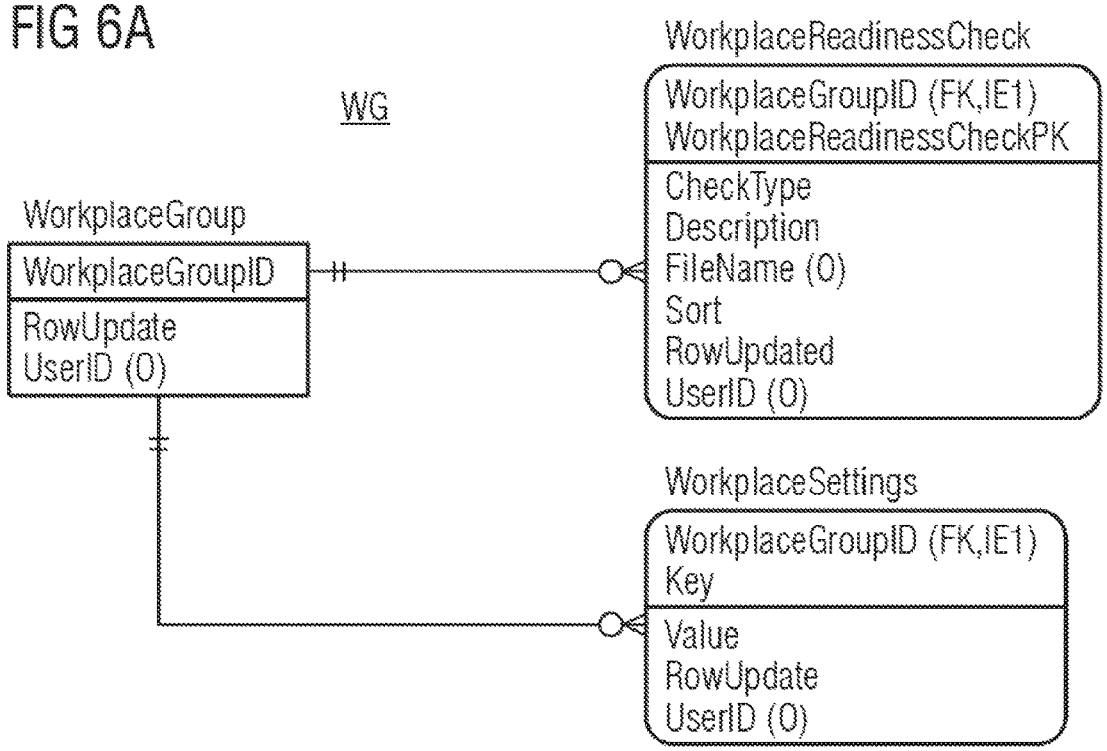
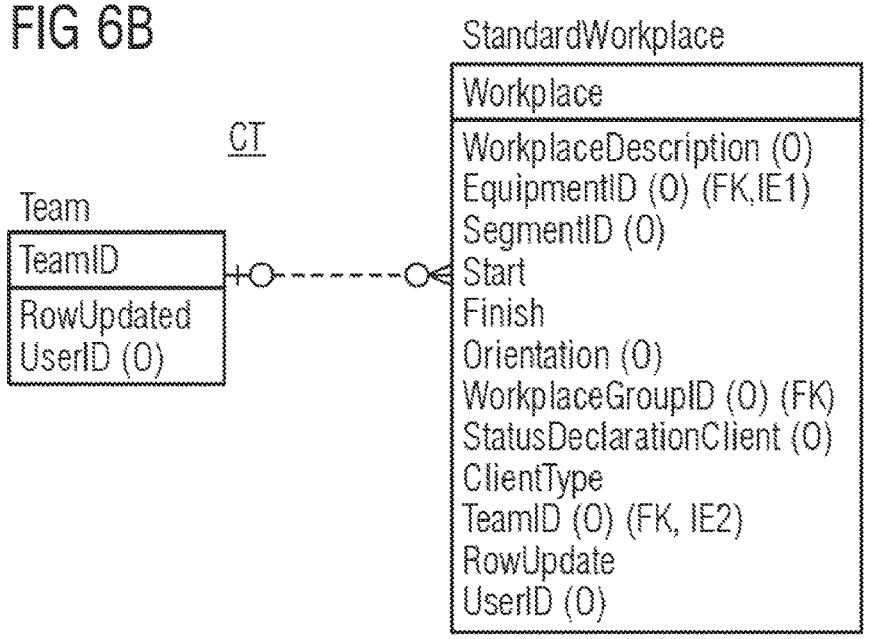

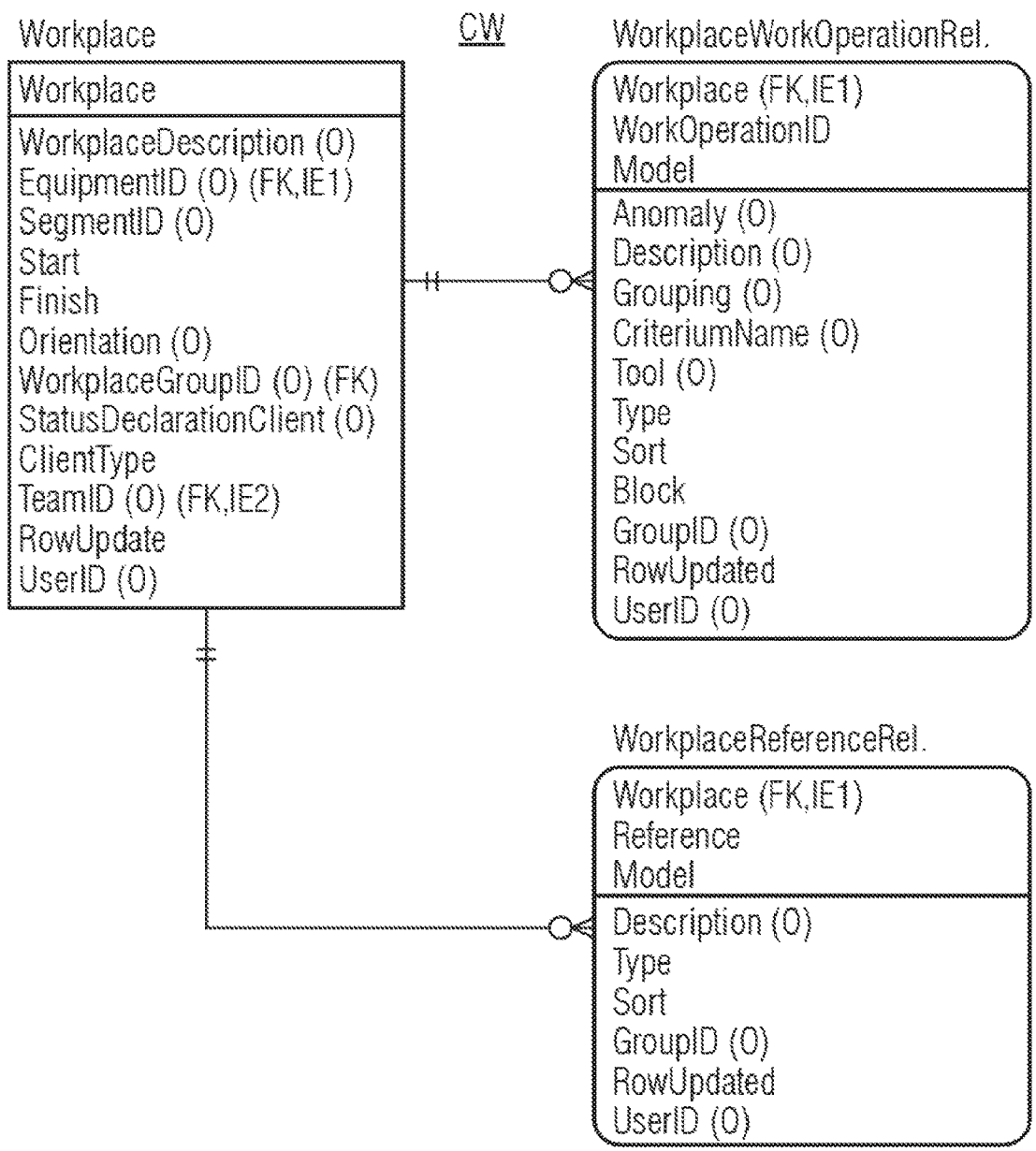

FIG 6I

ProductionOrderReachedFeatures
- ProductionOrderID (FK)
- ID
- Value
---
- ArchObj
- ArchiveValue
- Type
- Code (O)
- StatusID (O)
- IsDiffused
- UserID (O)
- RowUpdated

SI

ProductionOrder
- ProductionOrderID
---
- RowUpdated
- UserID (O)

ProductionOrderTransition
- ProductionOrderID (FK)
- StatusID
---
- Timestamp
- UserID (O)
- RowUpdated

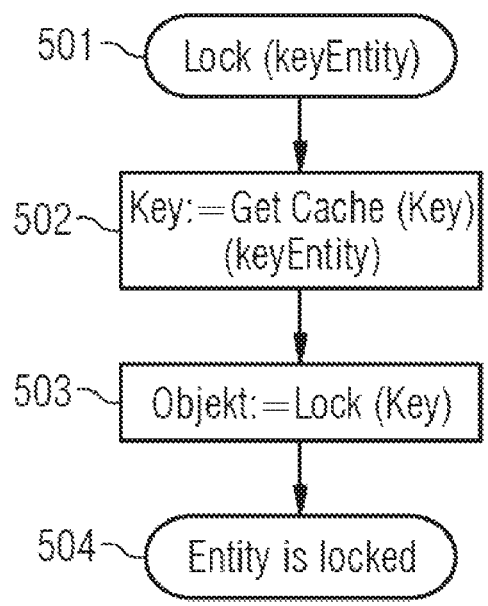

under 35 U.S.C. §
METHOD OF AND SYSTEM FOR CONTROLLING MANUFACTURING PROCESSES IN DISCRETE PRODUCTION LINES

CROSS-REFERENCE TO RELATED APPLICATION

This application claims the priority, under 35 U.S.C. § 119, of German application EP 15 156 885.4, filed Feb. 27, 2015; the prior application is herewith incorporated by reference in its entirety.

BACKGROUND OF THE INVENTION

Field of the Invention

The invention relates to a method and a system for controlling manufacturing processes in discrete production lines, especially in a production facility employing a computer managed manufacturing execution system (MES).

An exemplary application of the invention is in automotive assembly lines, to which particular reference will be made hereinafter for the sake of clarity.

FIG. 1 shows part of an automotive assembly line. The line includes a number of stations where operations are performed. For each station, one or more workplaces WP1, WP2, WP3 are configured, each containing the configuration for production operations. At runtime, each workplace WP1, WP2, WP3 contains a whole vehicle or a vehicle part, e.g. the frame, represented by its production order. Each production order contains the actual operations that must be performed on the vehicle (operation requests). Non-illustrated operator terminals at each workplace may show the operations of the production order that are associated with the workplace, their status and other relevant information.

The MES system of the production facility the assembly line belongs to consists of several different business components or business services (called hereinafter MES components) with specific functionalities, which interact with one another and collaborate to control the production and to account for it. Examples of MES components in the above application may be:

Vehicle (or Line) Tracking VT: a component that reads the positions of the vehicles on the line and triggers the events relevant to the current position;

Tool Management TM, controlling the operation of the tools at each workplace;

Quality Management QM, managing the quality processes;

Team Alert Management TA, notifying the line team of anomalous situations;

Material Consumption Management MC, managing the materials used in the line;

Operator Terminal OT;

Status Declaration SD, a component used in special workplaces to declare features that the vehicle has achieved, e.g. color, internal color, body specification, etc.; and Logging (LOG): a component logging events for diagnostics and performance measurements.

Other MES components can be added depending on the specific case: in fact, the possibility to expand the interaction to other components is a crucial requirement.

The operation of the MES components rests on data organized in MES entities (logical entities, in short LEs) resting on tens of tables which are stored in a database, typically a relational database, and can be bound by relationships that sometimes cannot be enforced by a database management system (DBMS) relational integrity. Data reading can occur for every type of user gesture (i.e. the request for a system status change) and field event (i.e. the system response just after a status change) that takes place in a MES component. Reading frequently these data upon the requests of even hundreds of operator terminals can be very consuming in term of time and resources, and, if data cannot be read in timely manner, the communications and the production itself are at risk to be threatened. For example, an operation might be of fast implementation (few seconds), but it may be slowed in that it requires waiting (another few seconds) until the relevant data are acquired, resulting in a delay for all subsequent operations.

Moreover, the gestures and the events can have consequences on both the existing MES components and future MES components which will be integrated into the system.

In existing systems, all MES components are mutually interconnected and bundled together, as shown in FIG. 2, and have access to database DB for acquiring the necessary data. In such an environment, two problems must typically be addressed:

the performance issue in data reading; and
the complexity in functional design and in source code due to the high number of interconnections between MES components.

As to the first problem, when a new vehicle enters a station, the operators inform the MES system and the MES components query the system for a lot of information to be retrieved from database DB. The data to be read are often the same; however each MES component is unaware that another component may have to read the same data. For these reasons, the risk of untimely information acquisition is high and becomes higher as the number of components and the line complexity increase, or if there is a need for more information by the components. This typically results in the need for investments in more powerful and expensive server side hardware to fulfill the performance constraints.

As to the second problem, every field event or user gesture is seen and implemented as an independent procedure that calls the participating MES components: the relevant software procedures call the components, take their responses and use them for subsequent calls, and so on. Every event/gesture has a convoluted implementation, often reduplicating code, since internal subroutines cause the same logics and subsequent calls. There is a business logics (mapping between gestures/events and calls to the MES components) interdependency with high complexity: this results, i.e., in difficulties in runtime diagnosis as call stacks may be very deep and convoluted, since triggers cause messages which cause other triggers inside the overall execution.

A further problem of the prior art organization is the lack of modularity. The MES components are bundled together and they cannot be combined fitting the needs of specific plants without changing their interaction. From a client point of view, this calls for investments in customization or in acquiring and running unneeded systems.

SUMMARY OF THE INVENTION

It is an object of the invention to overcome the drawbacks of the prior art.

According to the invention, a method of controlling a discrete production line includes the following steps:

transforming data of MES entities shared among the MES components from a first data model used in the database into a second data model;
providing a central cache for storing the shared data transformed into the second data model;
providing a hub arranged to communicate with all MES components, the cache and the database; and
at run time, making the MES components interact with one another and with the cache through the hub to control the production line.

Use of a cache memory could appear a straightforward solution for speeding up data acquisition procedure from a database. The MES system would be partially leveraged but, unless a specific data model is adopted, a lot of problems would remain unsolved, regarding in particular:
the concurrency, i.e., the simultaneous access of multiple components to the same data;
the need for a global reloading or refreshing the stored entities to resynchronize the cache, what is demanding in terms of I/O operations; and
the business logics interdependency and the source code complexity: every change request affects a lot of source code as each MES component depends on a lot of other MES components.

In inventive embodiments, the data transformation include creating in the cache groups of MES entities such that each group includes the MES entities used in the same points of an application and at a same moment. The entities included into each group comprise parent and child entities, and some parent entities can be included into the groups either in complete form, with all attributes, or in virtual form, without attributes.

In further inventive embodiment, the interaction among MES through the hub includes making the MES components and the hub communicating according to an event-oriented protocol including the steps of:
generating by a user or a MES component and sending to the hub gesture messages representing requests for status changes in the MES components and in the entities stored in the cache;
forwarding the gesture messages from the hub to concerned MES components;
sending back, from the concerned MES components to the hub, event messages representing occurred status changes; and
bouncing the event messages from the hub to concerned MES components.

In another inventive embodiment, the interaction of the MES components with the cache through the hub includes operating on the cache according to an optimistic/pessimistic read/update mechanism.

A system having means for performing the method is also provided.

Furthermore, a computer program element can be provided, containing computer program code for performing steps according to the above method when loaded in a digital processor of a computing device.

Additionally, a computer program product stored on a computer usable medium can be provided, containing computer readable program code for causing a computing device to perform the above method.

Other features which are considered as characteristic for the invention are set forth in the appended claims.

Although the invention is illustrated and described herein as embodied in a method of and a system for controlling manufacturing processes in discrete production lines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 6A to 6I are illustrations showing in more detail cacheable entities of FIG. 5;

FIGS. 7A to 7F are flow charts of operations performed on the cache;

DETAILED DESCRIPTION OF THE INVENTION

Figure 1:
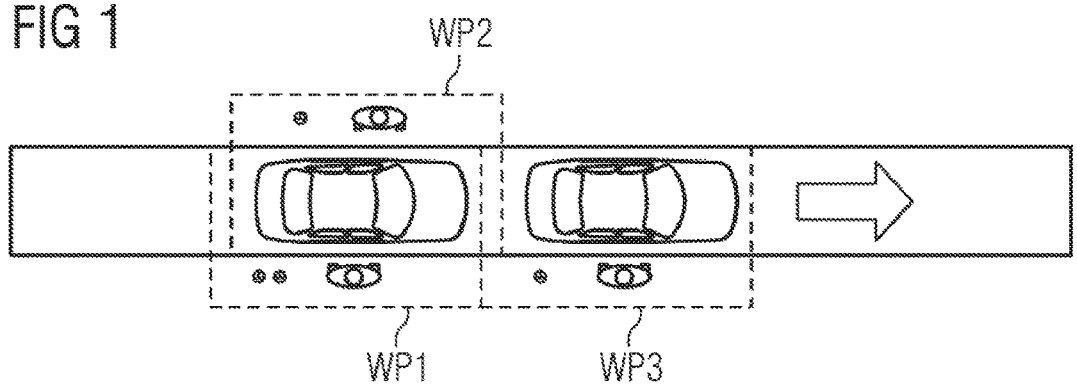
FIG. 1 is a schematic diagram showing a portion of an automotive assembly line.
Figure 2:
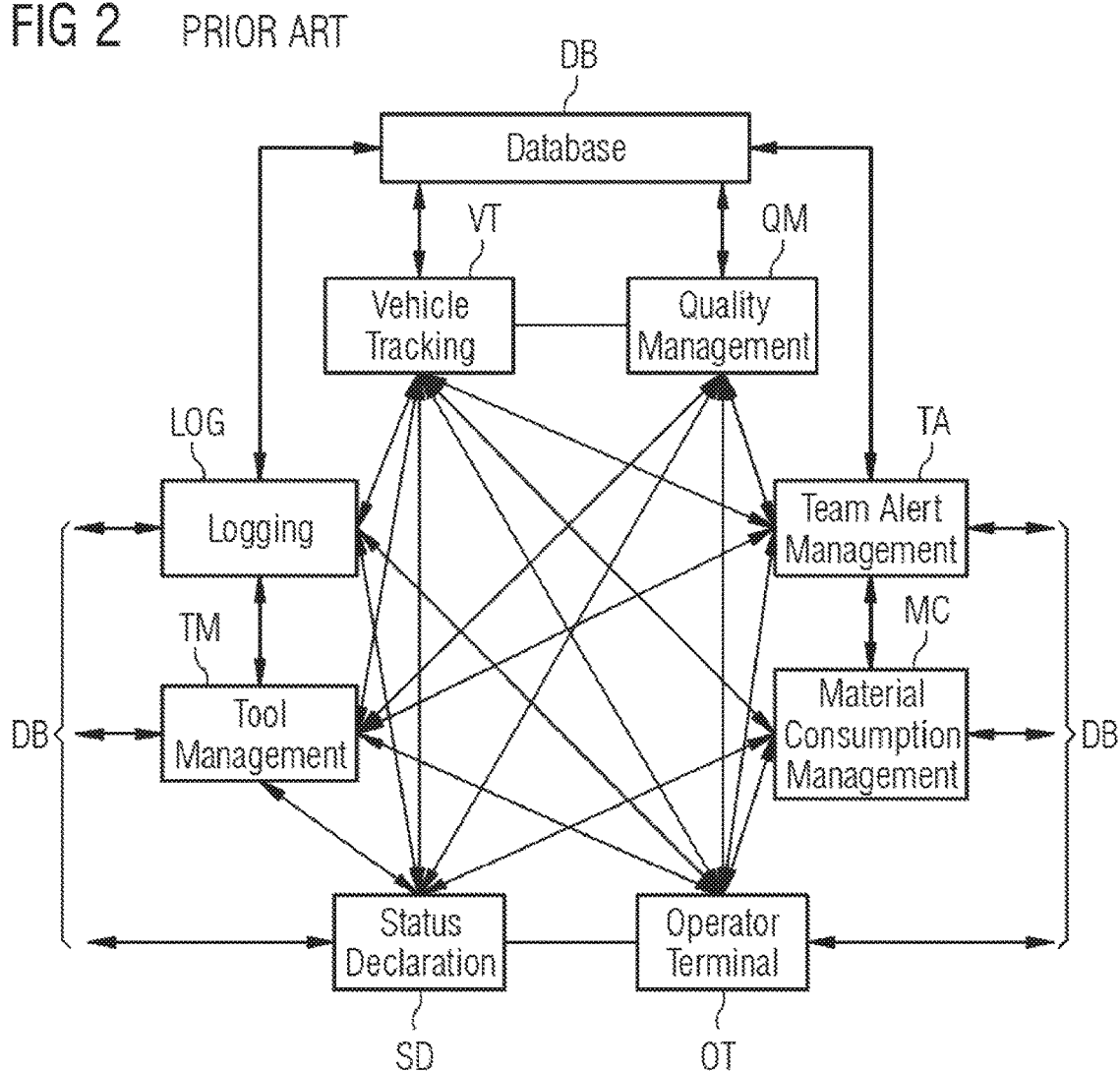
FIG. 2 is a graph of connections among MES components in the assembly line of FIG. 1, according to the prior art.
Figure 3:
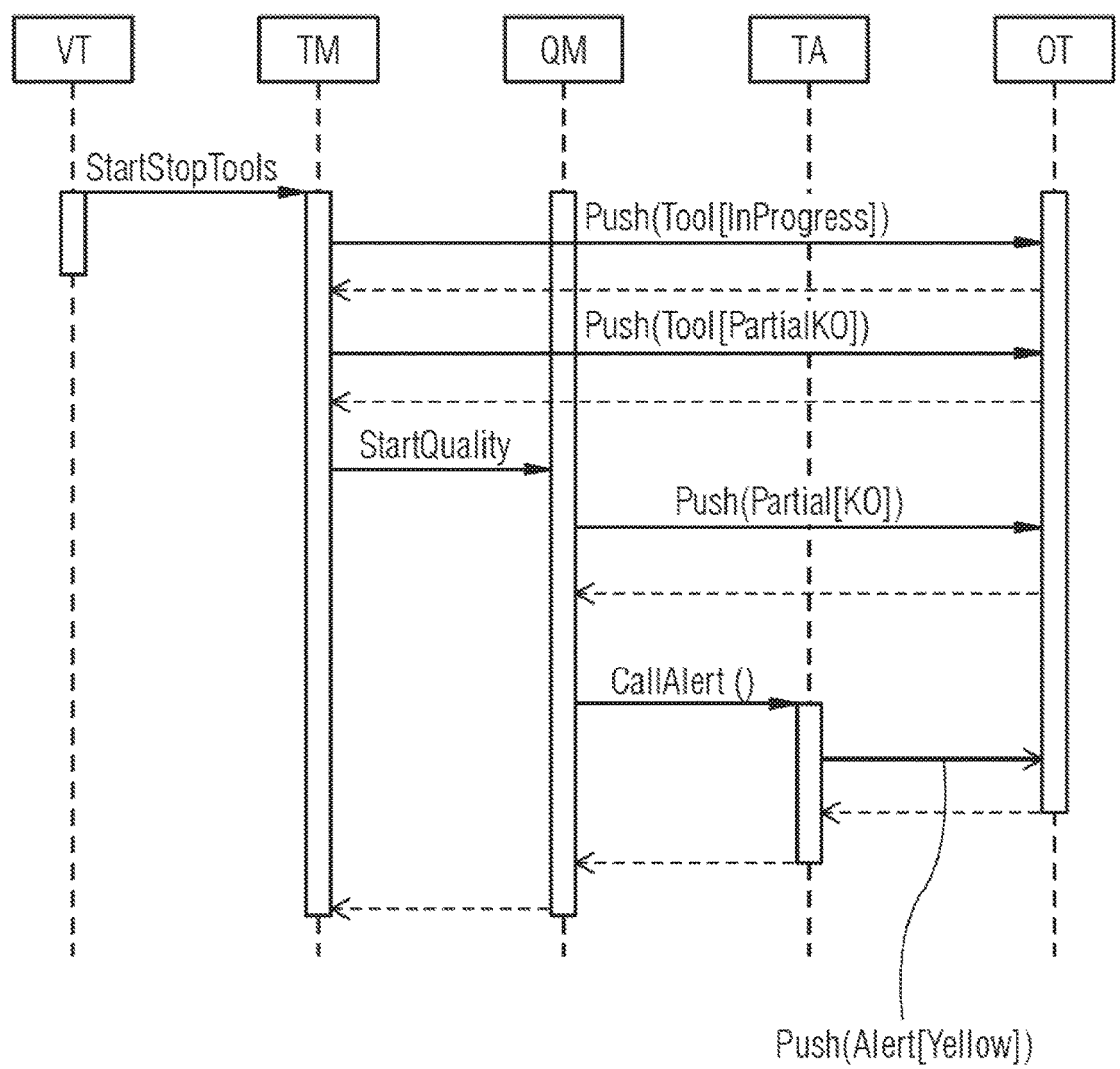
FIG. 3 is a sequence diagram of an example of interaction among MES components connected as in FIG. 2.

Referring now to the figures of the drawings in detail and first, particularly to FIG. 3 thereof, there is shown a sequence diagram of the interaction among the MES components connected as in FIG. 2 for a vehicle entrance a workplace WPi. Upon entrance, component VT notifies tool manager TM; after the response from TM, operator terminals OT observing that workplace are notified. Then, in some cases, quality business component is used to persist and process the status change and the operator is notified again. If some anomaly occurs (here concerning TM), quality management QM intervenes and makes team alert TA notify the team with the appropriate alerting device, known in the field as "andon". In this example, one tool operation has gone wrong, and OT shows this on the monitor and TA displays the andon. A management routine is to be implemented for each event and the routines are made complex by the interdependencies among the components.

Figure 4:
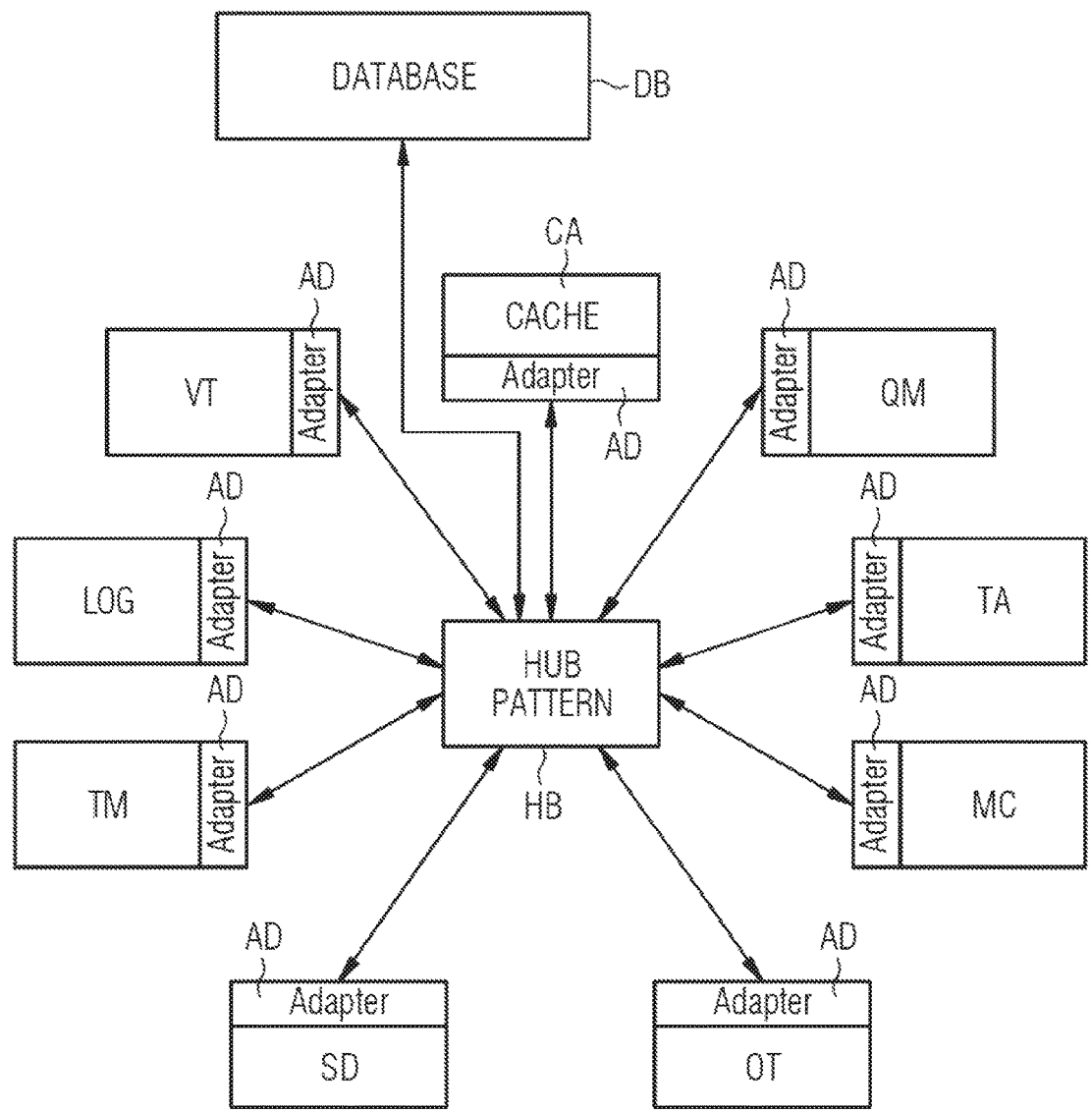
FIG. 4 is a graph of the connections among MES components in the assembly line of FIG. 1, according to the invention.

FIG. 4 shows the organization of the MES components according to the invention. The invention provides for the addition of two independent parts integrating and facilitating each other: a cache memory (or simply "cache") CA, shared among all MES components, and a hub pattern (or simply "hub") HB. All MES components are individually connected through respective adapters AD to hub HB, which in turn manages at runtime all operations in cache CA. HB is also entrusted with reading/updating database DB, when necessary. An adapter AD is provided also for cache CA.

The provision of cache CA entails a transformation of the data model used in database DB (e.g. a relational model) into a cache data model which can be conveniently stored in and retrieved from cache CA. The transformation takes into account that access to and update of an associative memory like a cache are fast but not so flexible as in a relational database, and allows identifying parent LEs (possibly virtual, i.e. without attributes) and child LEs. In the model according to the invention the most important criterion for data access is a "locality" criterion, and to this end Cache Entities (CEs) are created: these entities are groups of LEs such that all LEs used in the same points of the application and at the same moment are, as far as possible, included into a same CE. The LEs to be stored in cache CA include data which are shared among the MES components. Instead, data which are specific for one MES component are not aggregated, even if a reference to them is kept in order they can be invoked. They can be left in the database or held in a cache which is private/specific for the specific MES component.

Hub HB is a software engine implementing the procedural dependencies between MES services in an event-oriented manner: that is, instead of having routines that call other routines or subroutines, the invention is based on dependencies from gestures and MES component calls (bounced events). Hub HB receives gestures (generated by the users or in response to other events) and dispatches them to the appropriate MES components. Hub HB has the same shape and behavior vis-à-vis each MES component. Due to the event-oriented operation, it can also be defined as an "event engine".

Adapters AD are components adapting the gestures (consisting of a CE and an action to be carried out thereon) and the field event bounces (consisting of a CE and the status attained by it) to the protocol used by the different components. Adapters AD are designed (and maintained) only aware of:

the relevant triggers (gestures or bounces);
the appropriate behaviors in response to the triggers; and
the inbound pre-processor of field events: indeed, not all events are provided by MES components with all information needed for the event to be processed, and some events are irrelevant for the business logics. The MES component (the inbound "port", from MES component to MES runtime) is responsible for translating and filtering.

Figure 5:
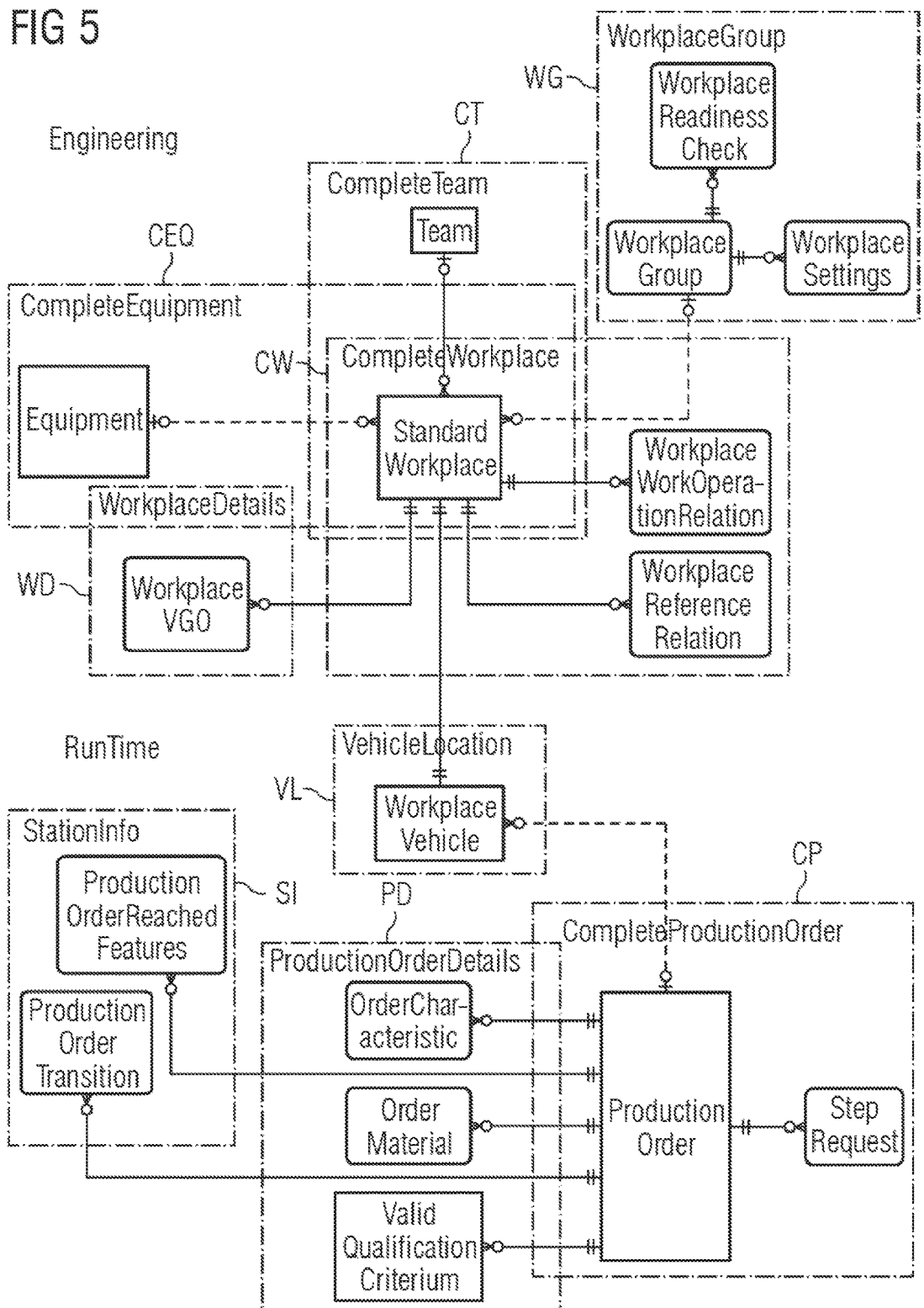
FIG. 5 is an illustration showing an exemplary data model organization in a cache.
Figure 6C:
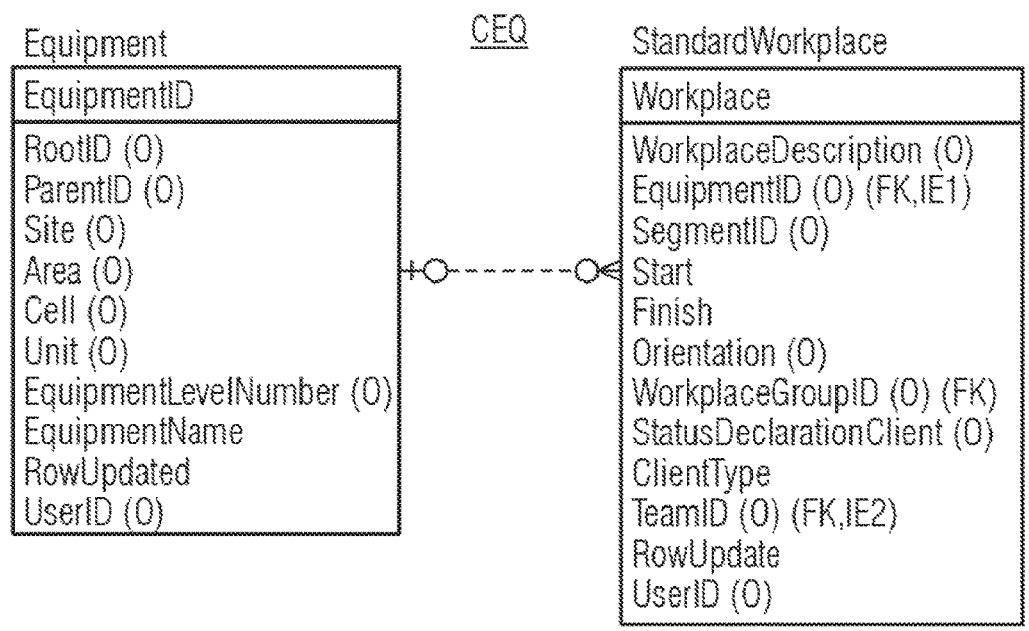
Figure 6E:
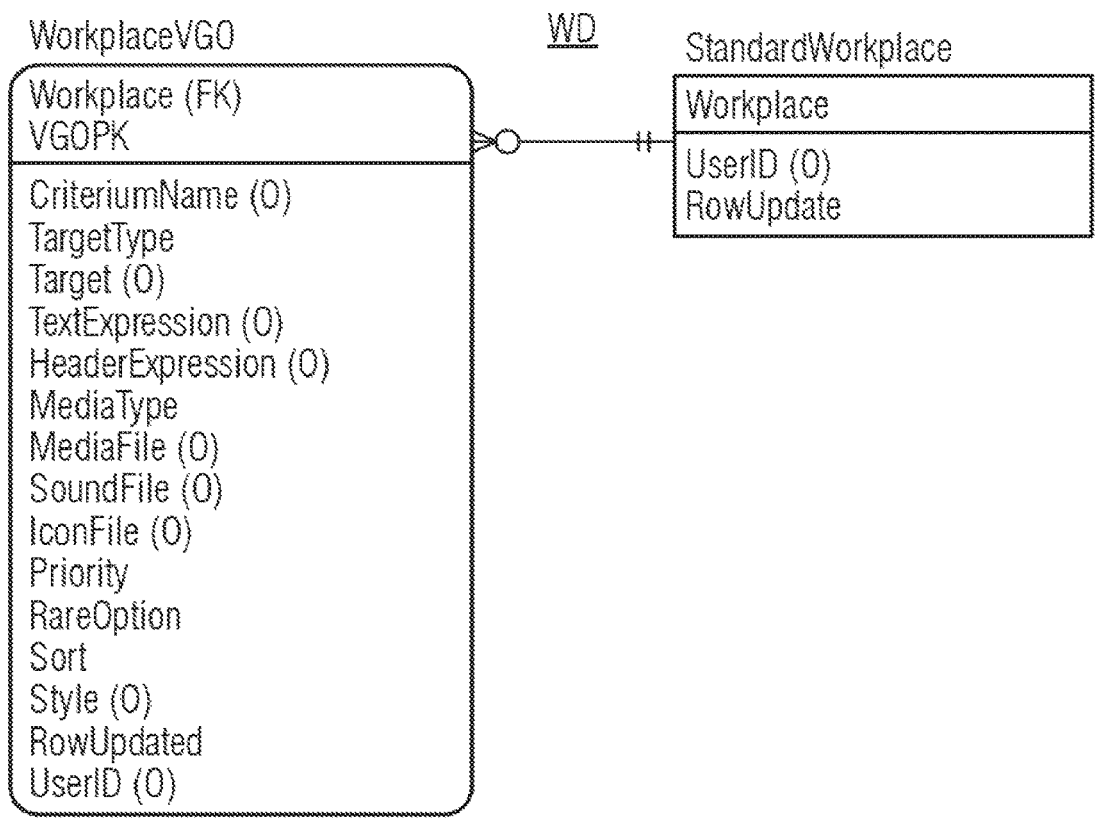
Figure 6F:
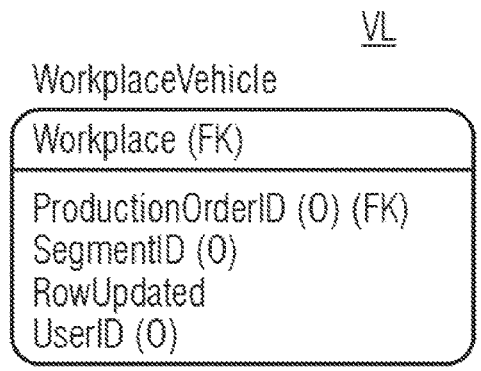
Figure 6G:
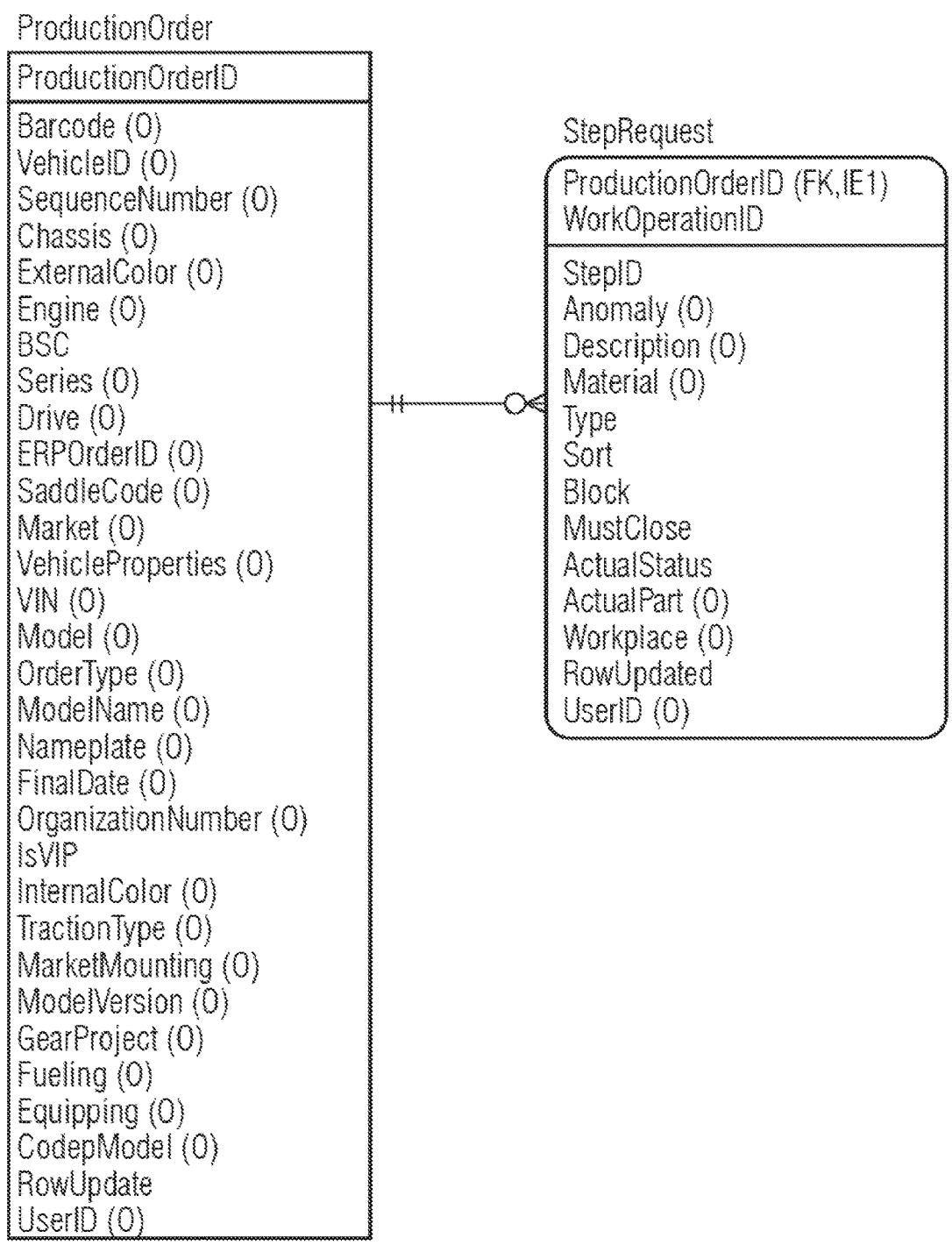
Figure 6H:
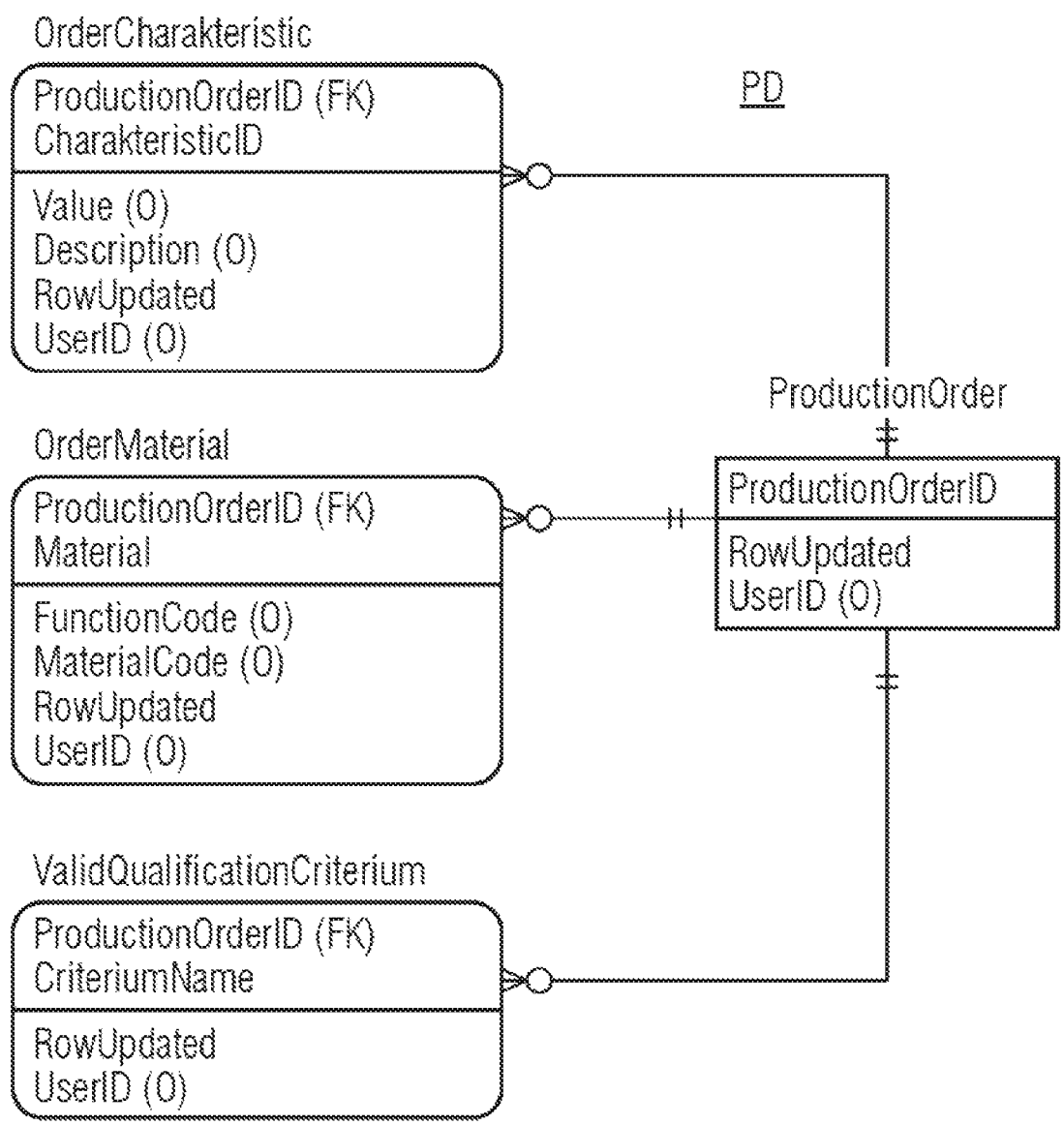

A data model organization for cache CA is schematically illustrated in FIGS. 5 and 6 (6A to 6I) for the exemplary application to an automotive production line. Dashed line boxes in FIG. 5 denote CEs and solid line boxes denote LEs. The relations among the different LEs are depicted by using the crow's foot notation. Solid line connectors denote identifying relations and dashed line connectors denote non-identifying relations.

For the sake of readability, FIG. 5 only shows the LE names, and the LE attributes are shown in FIGS. 6A to 6I. The parenthetical symbols associated with certain attributes respectively denote:

O: optional attributes;
IE: Inversion Entries, i.e. search indexes present in the underlying physical entity; and
FK: Foreign Key.

For LEs whose tasks are not immediately apparent from the name, a short explanation is provided. It is not necessary to go into the details of the individual attributes, which are specific for the exemplary application and whose meaning is clearly apparent. Attributes "RowUpdated" and "User" present in all LEs indicate the time at which the LE has been created or modified and the author of the modification.

As stated, the CEs gather LEs used in a same point of the application and at a same moment. Grouping of the LEs into the CEs is essentially based on:
frequency of data access (e.g. from low to high); and
phase of usage, in particular engineering (or configuration) time or runtime.

Also the data size can be a grouping criterion.

For the engineering phase, the following CEs are designed: WorkplaceGroup WG, including the following LEs: Workplace Group (parent), Workplace Settings and Workplace Readiness Check (children); CompleteWorkplace CW, including the following LEs: StandardWorkplace (parent), WorkplaceWorkOperation Relation and WorkplaceReferenceRelation (children). WorkplaceWorkOperation Relation describes operations to be performed or checked in a workplace and WorkplaceReferenceRelation describes certain connections to contents which are useful to an operator in the workplace (typically, graphical projections indicating problems of specific parts); StandardWorkplace is in turn a child of WorkplaceGroup; WorkplaceDetails WD, including the WorkplaceVGO (Visually Guided Operation) LE with data for special operations; this entity is a child of Standard Workplace; CompleteTeam CT, including Team (parent) and Standard Workplace (child) LEs; CompleteEquipment CEQ, including Equipment (parent) and Standard Workplace (child) LEs.

For the runtime data, the following CEs are configured:
VehicleLocation VL, containing only the WorkplaceVehicle LE: it is a junction entity linking the engineering and runtime data;

CompleteProductionOrder CP, including the Production Order (parent) and Step Request (child) LEs; the latter is an LE describing the practical operations and quality processes necessary for a production order. ProductionOrder is a father also for Workplace Vehicle;

Production Order Details PD, including the following LEs: OrderCharacteristic, OrderMaterial and ValidQualificationCriterion (logical true conditions on vehicle characteristics that condition operations and status declarations): all these LEs are children of ProductionOrder;

Station Information SI, including the Production Order Reached Feature and Production Order Transition LEs, which provide data used in the execution of the tasks of component SD (FIG. 4).

Due to the criterion adopted for designing the CEs, certain LEs may belong to different CEs. Moreover, the LEs belonging to different CEs may be included either in complete form, with their attributes, or in virtual form, without attributes. The LEs present in virtual forms are shown only in the concerned FIGS. 6A to 6I.

In the example, this multiple appurtenance concerns StandardWorkplace LE, present in complete form in CT, CW and CEQ and in virtual form in WD, and ProductionOrder LE, present in complete form in CP and in virtual form in PD. This is because the "Complete" CEs are used very often and in many subroutines, whereas the "Details" CEs are used only occasionally for integrating the "Complete" CEs: creating the CEs also based on the frequency of use dispenses with having continuously to manipulate very big entities, where part of the contents is unused for long periods. The frequency of use can be a general criterion for the inclusion of the LEs into CEs in complete or virtual form.

It is also to be appreciated that every CE, besides a primary key, has other alternative keys that are implemented in cache CA to support searches.

Differently from a conventional cache, cache CA is not to be refreshed within a given deadline: rather a concept of optimistic/pessimistic reading/updating is exploited.

To this end, the software managing operations in the data cache can be seen as including the following components:
a façade interfacing with the user and helping aggregating data from cache CA;
a data reader supporting querying fresh data;
a repository service managing accessing cache data;
a cache manager, implementing the advanced logics for managing cache CA and interrogating it; and
a data cache, encapsulating the actual caching service, which can be entrusted to a third party or even disabled for testing purposes or in case of system degradation.

A data context, modeling the database, can be also provided.

The repository service implements a method of data reading and updating by the different worker threads, i.e. the subjects participating to the concurrency. More particularly, when a worker thread needs to read data, it queries repository service, which optimistically interrogates the cache manager to get the relevant entity from cache CA. If the entity is not present ("miss") or is invalid ("stale", according to specific criteria), then it is read from the database pessimistically, i.e. by locking the key during the operation to prevent concurrency. When a worker thread, typically the cache adapter, receives the information that an entity has changed, it calls the repository service passing the update to execute. The repository in turn pessimistically searches the cache manager:
if the entity is present in cache (hit), it is updated and returned while holding the lock; and
in case of missing or invalid entity, it is read again from the database, where the entity always has the current status, saved in cache CA and returned.

The optimistic/pessimistic read/update procedure is shown in FIGS. 7A to 7F. There, "entity" denotes a CE. The other terms and the symbolism used are conventional in the art. The subroutines of the procedure take into account that cache CA associates strings with objects, so that browsing through the cache takes place as follows: given a key, the associated object searched for; if the object is a string, the associated object is searched for, and so on. In practice, only one link level is defined, consisting of the alternative keys. For instance, referring the example of FIGS. 5 and 6 and assuming that the cache operation to be made concerns ProductionOrder X (i.e. a CE) having ID=x (x is a string) and a vehicle identification number VIN=y (which is the alternative key and is a string), associations x→X and y→x are defined (string→CE, string→string), so that a search by y will return x and a subsequent search by x will return X.

Figure 7A:
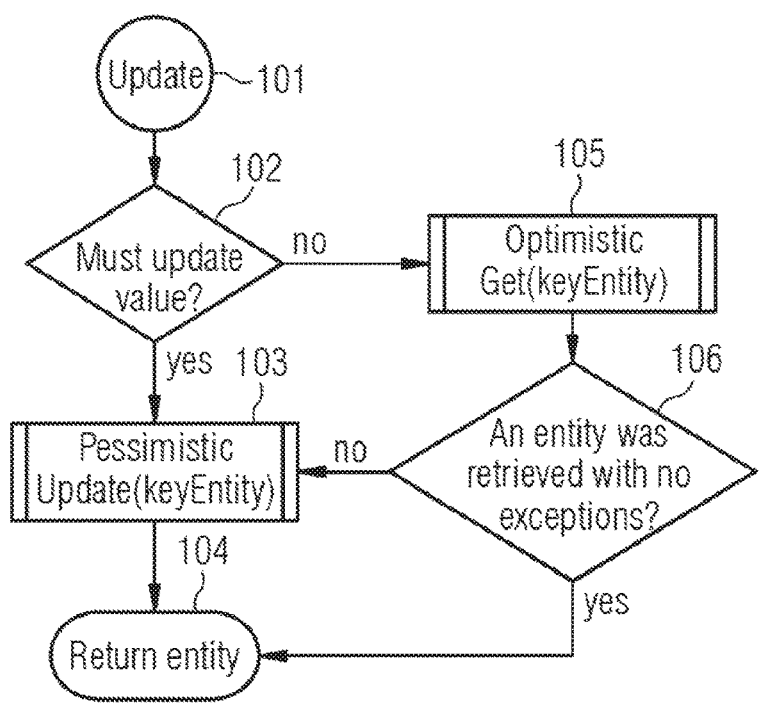

FIG. 7A is the general procedure. When an operation, generally referred to as "update", is requested (step 101), it is checked whether a value is actually to be updated (step 102). In the affirmative, update subroutine is pessimistically performed for the concerned entity (step 103) and the updated entity is returned (step 104). In the negative (step 102, output no), the entity is optimistically read (step 105). The process then goes to step 104 or to step 103 according to whether or not an entity is retrieved without exceptions.

Figure 7B:
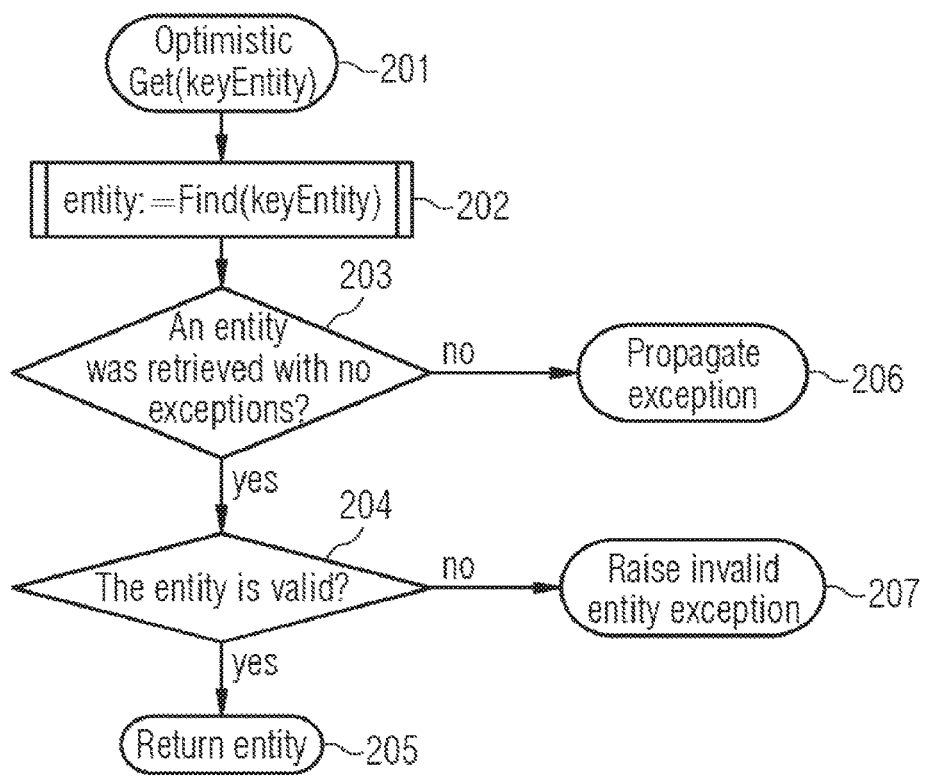

FIG. 7B details the optimistic get subroutine. Step 202 defines the entity to be got (by assigning it the key value returned by subroutine Find(KeyEntity)), and step 203 is the same check as that in step 106 (FIG. 7A). If this check has a positive outcome, it is further checked (step 204) whether the entity is valid and, in the affirmative, the entity is returned (step 205). In case of negative outcome of check 203, the exception is propagated (step 206) and, in case of negative outcome of check 204, the invalid entity exception is raised (step 207).

Figure 7C:
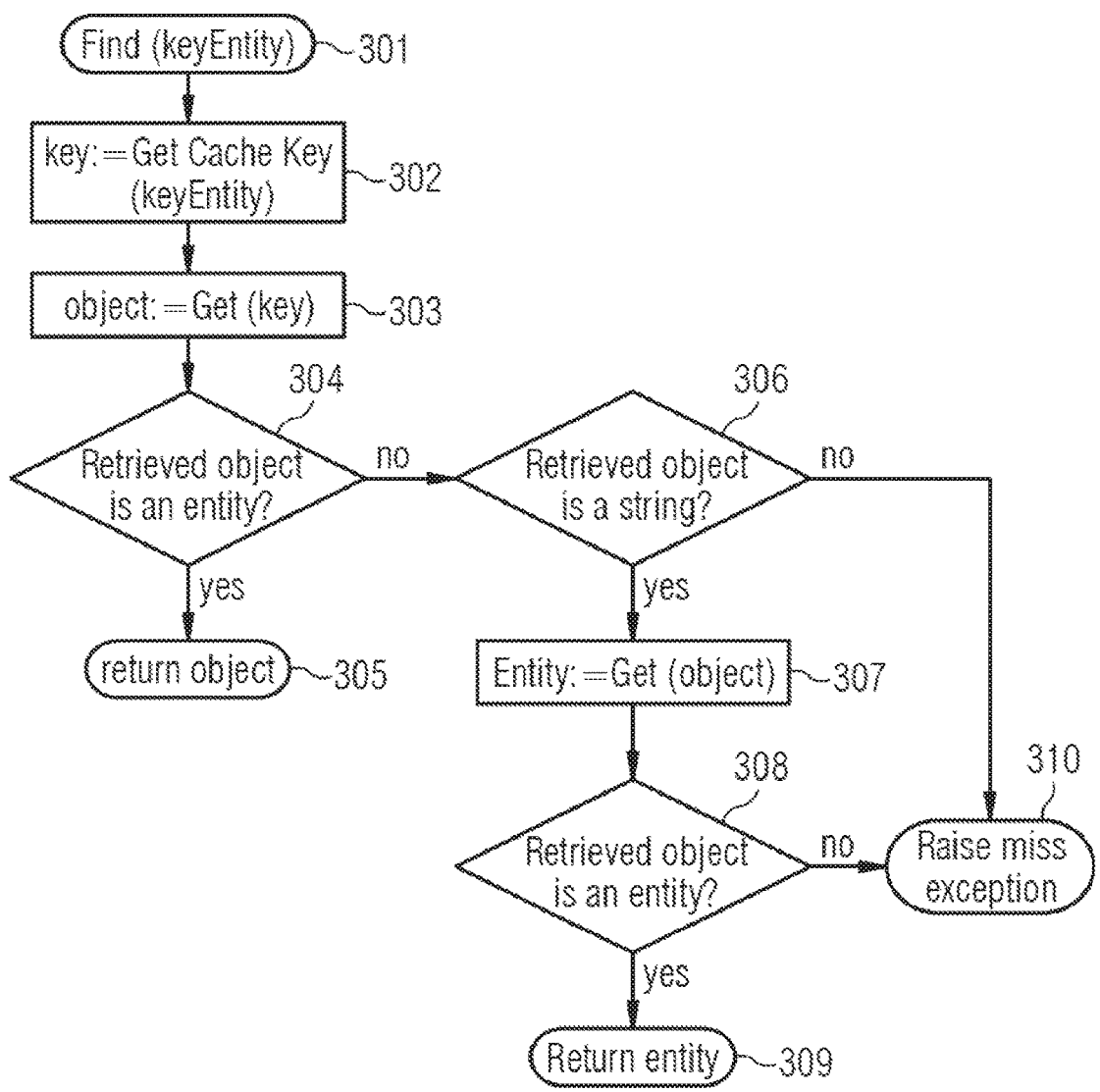

FIG. 7C details the Find(keyEntity) subroutine called at step 202 of FIG. 7B. At steps 302, 303, the key and the object to be found are defined. At step 304 it is checked whether the object retrieved is an entity and, in the affirmative, the object is returned (step 305). In the negative, it is checked whether the object retrieved is a string (step 306). In the negative, a miss exception is raised (step 310). In the affirmative, starting from the string, the object is read (step 307). Then it is checked again whether the object retrieved is an entity and in the affirmative the object is returned (steps 308, 309), whereas in the negative the miss exception is raised (step 310).

Figure 7D:
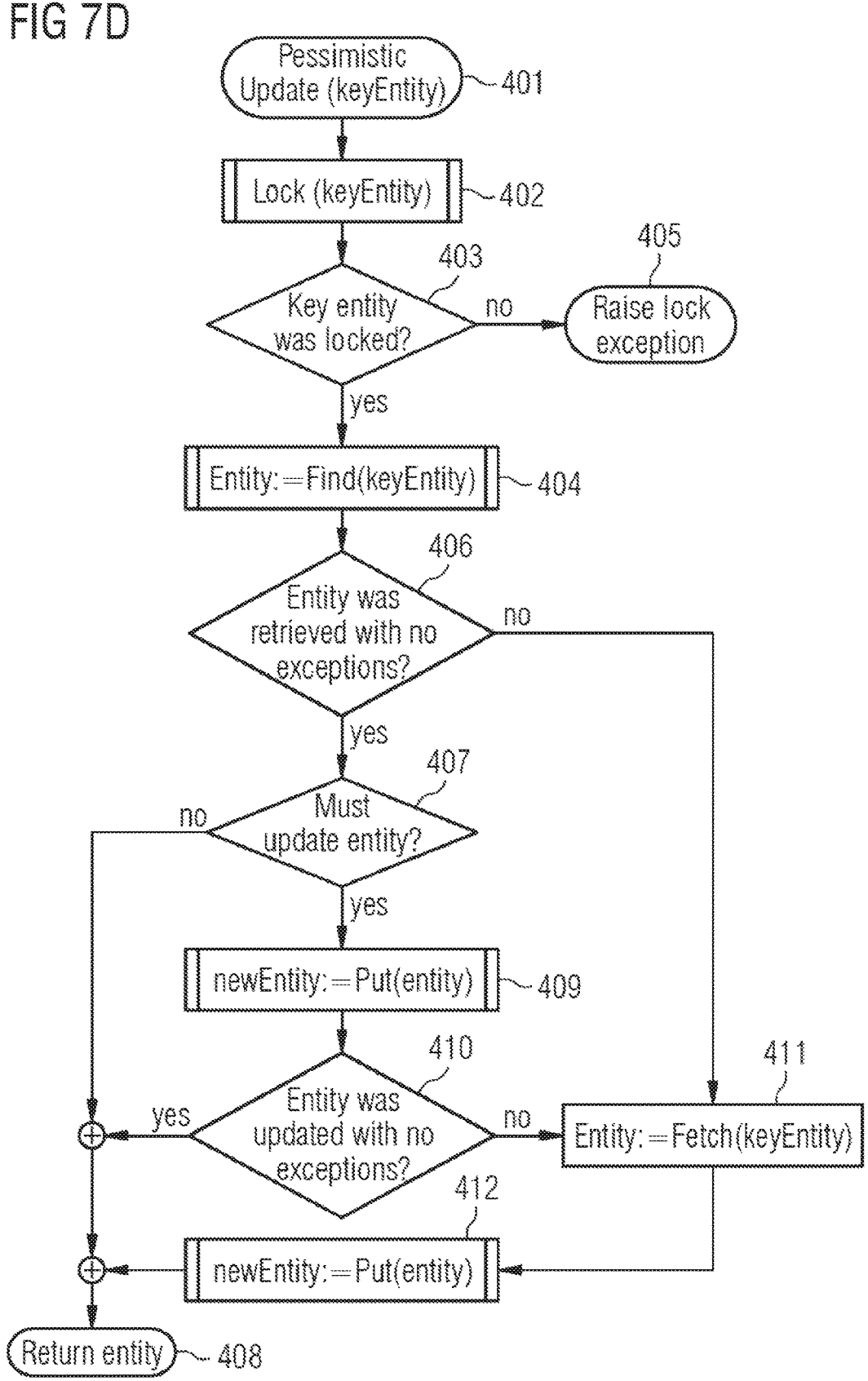

FIG. 7D details the pessimistic update subroutine. The first step is the lock of the key (step 402). A check on the locking is made at step 403: in case of positive outcome, the entity corresponding to the key is searched for (step 404), whereas, in the negative, the lock exception is raised (step 405). If the entity is retrieved with no exceptions (output yes of step 406), it is checked whether an update is necessary (step 407). In the negative, the entity is returned (step 408). In the affirmative, the entity to be updated is defined (step 409) and a check is made on whether the entity has been updated with no exceptions (step 410). In the affirmative, the process goes to step 408 and in the negative goes to a fetch step 411. Step 411 is also reached in case of negative outcome of check 407. Thereafter, a put step 412 like step 409 is performed and step 408 is reached.

FIG. 7E details the lock subroutine. The key to be locked is defined at step 502 and the locking is performed (steps 503, 504).

Figure 7F:
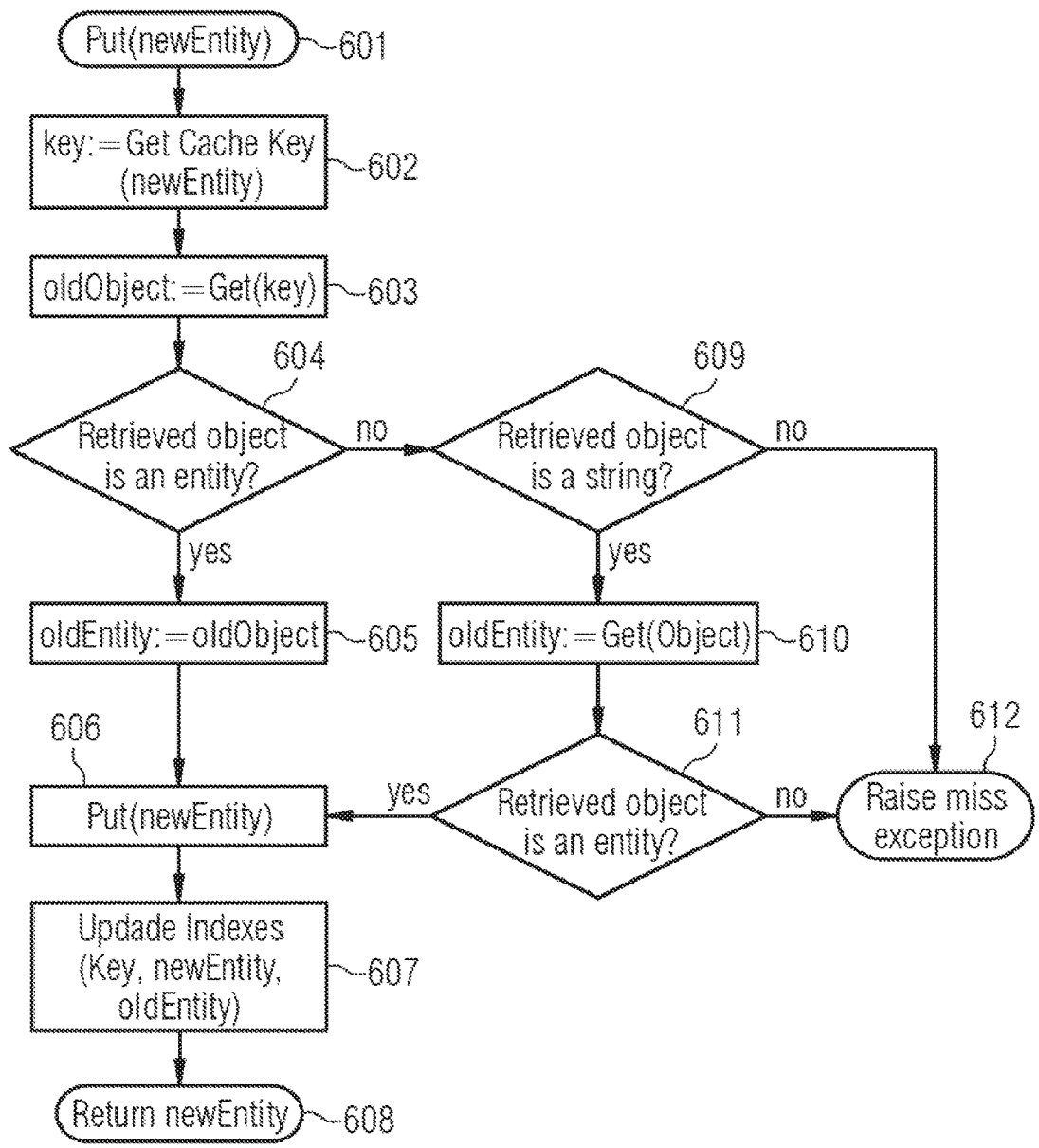

FIG. 7F details the put subroutine. Steps 602 to 604 and 609 substantially correspond to steps 302 to 304 and 306 in FIG. 7C, except that the get(key) subroutine is performed on an old Object. In case of positive outcome of step 604, the "old object" value is assigned to the old entity (step 605) and the put subroutine is performed for the new entity (step 606). After the indexes for the key, the new entity and old entity have been updated (step 607), the new entity is returned (step 608). In case of positive outcome of check 609, the get subroutine is performed for the object (step 610) and, if the retrieved object is an entity, the process passes to step 606. If the retrieved object is not a string or is not an entity (negative outcome of step 609 or 611, respectively), the miss exception is raised (step 612).

Of course, direct database modifications are supported for robustness of the system and, on the other hand, they are often needed in industry applications. In any case, the logical entities saved in cache CA are given an expiration time, at the end of which they are updated with the corresponding values stored in the database. Thus, even if an entity is updated directly in the database, after a long (but fixed) period it will always be synchronized with its cached counterpart, and the cache can be considered as a convergent copy of the database.

It is to be appreciated that the adapter of cache CA manages all status changes in the entities present in the cache itself. In this manner, at runtime, the ProductionOrder CEs are aligned with the LEs they mirror.

The changes in the cached objects are normally notified as events from the MES components involved. This means that the architecture must be configured in terms of elementary messages that go from the field to MES Runtime, which is a public representative of an execution service (a class of the hub software). The MES Runtime then bounces each message that can be managed by other MES components. Also bounced events are here referred to as gestures and follow the path of other gestures that, more typically, flow from the user to the MES Runtime and then to the different components.

Figure 8:
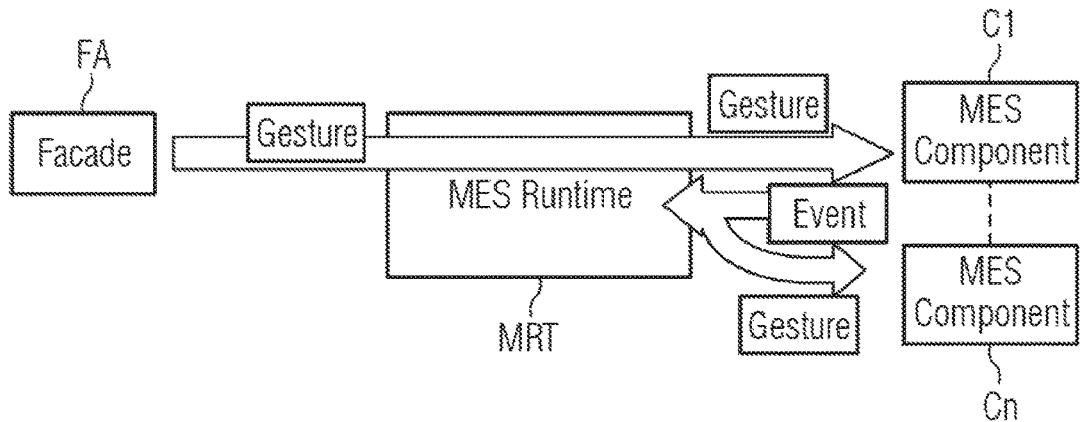
FIG. 8 is a schematic diagram of the operation principles of the hub pattern.

The above operating manner based on "gestures and events" is shown in FIG. 8. There, fagade FA is an interface between the graphic user interfaces, GUIs, of the operators and the system, hiding the complexity of the MES components and of the data model based on the CEs). FA sends a gesture to MES Runtime MRT upon request of a GUI, and MRT loops through adapters AD (FIG. 4) of MES components C1 . . . Cn and activates the adapter(s) of the component(s) interested in the gesture. The activated component(s) Ci send(s) an event message to MRT, which bounces the event to another component in the form of another gesture.

In general, according to this point of view, in the exemplary application, the different production events can be assigned to the different adapters, together with the events raised from within, according to the following table I. The syntax used is:
Gestures: <verb to execute>"+"<type>["["binary traits"]"];
Events: <type>["["binary traits"]"] "+"<achieved status>.
"Type" indicates a CE and "binary traits" indicates a type of the CE, which depends on constraints on the attributes.

Not that HB can call the adapters in any suitable matter, e.g. according to a sequential call, as assumed here, or according simultaneous call of all adapters, or with a synchronism level intermediate between such extremes.

Figure 9A:
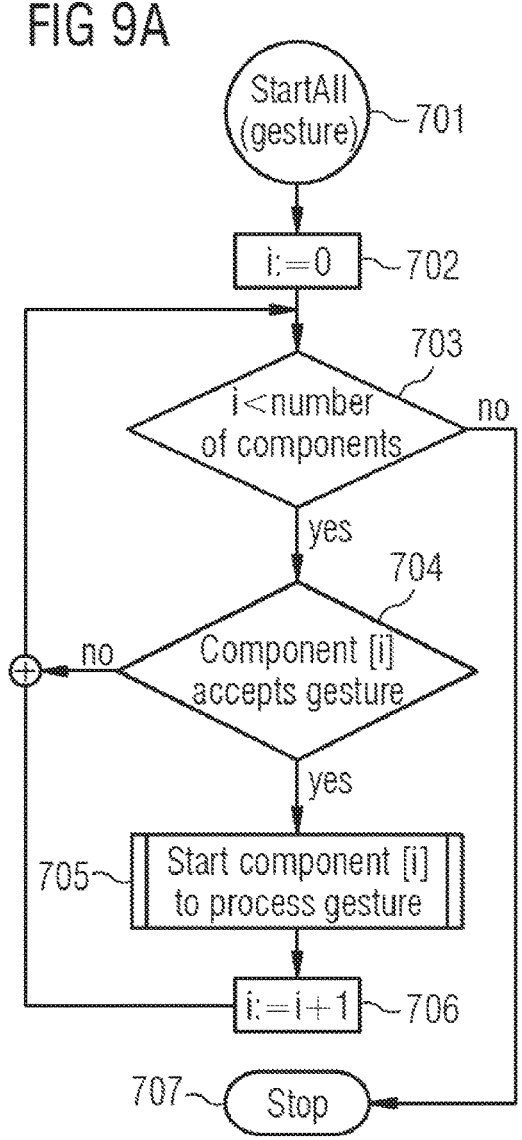
FIGS. 9A and 9B are flow charts of functions used in the hub operation.

The Start procedure transforms the events in gestures (step 802) and the transformation starts the procedure of FIG. 9A (step 803).

The separation of the two logics is useful in integrating the adapters into off-the-shelf technologies relying on subscriptions logics by translating the accept logics only.

Figure 10:
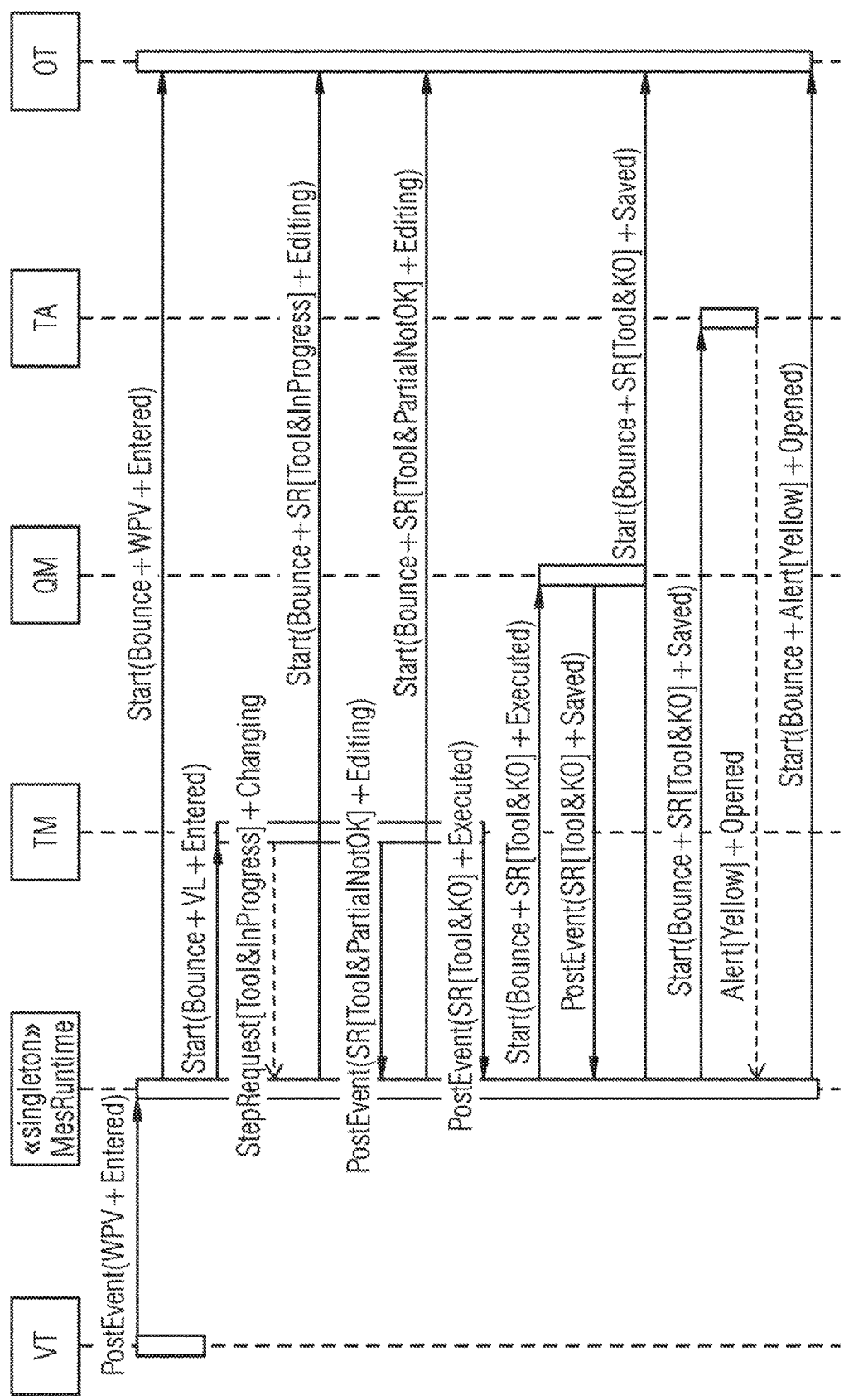
FIG. 10 is a sequence diagram of an example of interaction among MES components when using the invention.

FIG. 10 is the sequence diagram for the vehicle entrance into the line, when the invention is used. When the vehicle enters workplace WPi, component VT starts a gesture and sends a relevant message to MES Runtime in hub HB. HB notifies operator terminals OT observing that workplace and tool manager TM (in this case, with the indication of the VehicleLocation entity), which responds to HB with an event message containing a certain type of the StepRequest (SR) entity. Upon such a response, HB bounces the event to OT. In case of a tool failure (trait "Tool&PartialNotOK"), the dialogue by means of gestures and bounced events proceeds between TM and HB, HB and QM, HB and TA, with HB notifying every time OT. It is self evident that each component sees only its own data section and that the

TABLE I

| ES COMPONENT | ACCEPTED GESTURES | ACCEPTED BOUNCED EVENTS | RAISED EVENTS |
|---|---|---|---|
| A | | ProductionOrder + Changed StepRequest + Saved VehicleLocation + Entered VehicleLocation + Exited VehicleLocation + Created VehicleLocation + Deleted WorkplaceGroup + Changed StandardWorkplace + Changed StationInfo + Changed | |
| T | | Alert StepRequest + Executed VehicleLocation + Entered VehicleLocation + Exited VehicleLocation + Warning StationInfo | |
| M | Do + StepRequest[Operation] Do + StepRequest[Tool&Final] | StepRequest[Tool&NonFinal] + Executed VehicleLocation + Exited | StepRequest + Saved Alert + Opened |
| M | Do + StepRequest | VehicleLocation + Entered VehicleLocation + Exited | StepRequest + Editing StepRequest + Executed |
| A | Do + Alert Undo + Alert | StepRequest + Saved | Alert + Opened Alert + Closed Alert + Changed |
| T | | | VehicleLocation + Entered VehicleLocation + Exited VehicleLocation + Warning VehicleLocation + Created VehicleLocation + Deleted |
| D | Do + StationInfo | | |

Figure 9B:
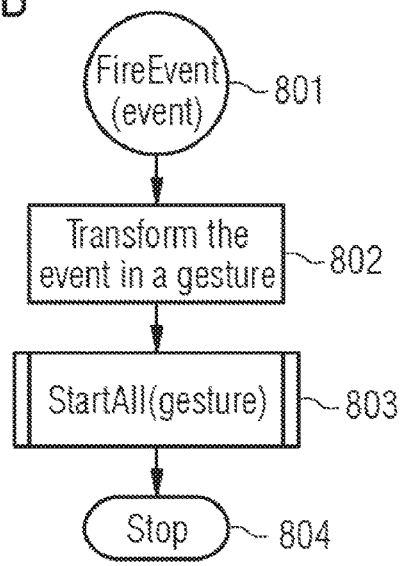

The "gesture and event" operation can be schematized by two logics, "Accept" (for gestures) and "Start" (for events), shown in FIGS. 9A and 9B, respectively.

The Accept procedure is started by a gesture (step 701) and cycles through all MES components (step 702, 703, 706). For each component (step 703), the cycle contains a check on whether the component accepts the gesture (step 704) and, in the affirmative, the gesture processing in the component (step 705). If the component does not accept the gesture (output no of step 704), the process passes to the subsequent component. When all components have been called (output no of step 703) the process is stopped.

routine can be split in smaller and more understandable parts, thereby solving the interdependencies.

The provision of cache CA and hub HB affords significant advantages.

Cache CA allows a timely access to the data and leverages the other software tiers from the delay due to data retrieval. Indeed, fewer calls to the database lead to less concurrency, fewer locks, fewer deadlocks, dead complexity in diagnosing problems. Moreover, cache CA can be independent from technologies for data manipulation strategies and can also optimize concurrency on specific objects instead of records of [sometimes >10] database tables.

Hub HB is characterized by ease of design, development, and maintenance: so analysts have just to focus on the gestures and event bounces to which the single MES components must react and the field events they must raise, without elaborating all possible consequences.

Besides, every dependent behavior must be implemented just in one place.

Further, since the MES components are not bundled together, the adapters of components that are not needed can be simply "unplugged" without risk of regression or performance problems. Also, commercially, the software for a specific application can be offered without the need of the components that are not called for.

It is also to be pointed out that, without a cache, hub HB results in an awkward solution since each module would have to read its own data from the database and the performance problems would become worse. On the other hand, without hub HB, the cache would need to poll the database for changes instead of relying on changed status events from the MES components provided through HB. Thus, with the combination of the cache and hub HB, entities can be read when they are needed and cached entities can be updated punctually.

In addition to the embodiments of the present invention described above, the skilled persons in the art will be able to arrive at a variety of other arrangements and steps which, if not explicitly described in this document, nevertheless fall within the scope of the appended claims.

The invention claimed is:

1. A method for controlling a discrete production line in a manufacturing plant employing a computer-managed manufacturing execution system (MES system), wherein the MES system includes a set of MES components interacting with one another in order to control different production phases, and the MES components use, for the control, data of MES entities which are stored in a database according to a first data model, the method comprises the following steps of:
    transforming the data of the MES entities shared among the MES components from the first data model into a second data model, wherein the second data model is a cache data model indicating a relationship between the MES entities;
    providing a central cache for storing shared data transformed into the second data model;
    providing a hub disposed to communicate with all the MES components, the central cache and the database; and
    during run time, making the MES components interact with one another and with the central cache through the hub to control the discrete production line.

2. The method according to claim 1, wherein the transforming step further comprises creating in the central cache groups of the MES entities each including the MES entities used in same points of an application and at a same moment.

3. The method according to claim 2, wherein the MES entities included into the groups include parent entities and child entities and, in the transforming step, the parent entities are included into the groups either in complete form, with all attributes, or in virtual form, without attributes.

4. The method according to claim 1, wherein the step of providing the central cache further comprises setting an expiration time for the MES entities stored in the central cache itself, and updating the MES entities, at an end of the expiration time, with corresponding values stored in the database.

5. The method according to claim 1, wherein the MES components and the hub communicate according to an event-oriented protocol including the steps of:
    generating at a MES component, and sending to the hub, gesture messages representing requests for status changes in the MES components and in entities stored in the central cache;
    forwarding the gesture messages from the hub to concerned MES components;
    sending back, from the concerned MES components to the hub, event messages representing occurred status changes; and
    bouncing the event messages from the hub to concerned MES components.

6. The method according to claim 5, which further comprises equipping each of the MES components with an adapter disposed to translate the gesture messages and bounced event messages into a format used within the component and vice versa.

7. The method according to claim 1, wherein the step of making the MES components interact with the central cache through the hub further includes operating on the central cache according to an optimistic/pessimistic read/update mechanism.

8. The method according to claim 1, which further comprises equipping the central cache with an adapter managing all status changes in entities stored in the central cache itself.

9. A system for controlling a discrete production line in a manufacturing plant via a manufacturing execution system (hereinafter MES system), wherein the MES system containing a set of MES components interacting with one another in order to control different production phases, and the MES components use, for the control, data of MES entities which are stored in a database according to a first data model, the system comprising:
    a central cache for storing the data of the MES entities shared among the MES components and organized according to a second data model, wherein the second data model is a cache data model indicating a relationship between the MES entities; and
    a central hub to which all the MES components, the central cache and the database are connected, wherein the MES components are disposed to interact, at runtime, with one another and with said central cache through said central hub.

10. The system according to claim 9, wherein, for an interaction of the MES components with one another and with said central cache through said central hub, the MES components contain means for implementing an event-oriented communication protocol based on:
    gesture messages, which represent requests for status changes in the MES components and in the MES entities stored in said central cache and are sent from an originating component to said central hub and from said central hub to concerned MES components; and
    field event messages, which represent occurred status changes and are sent back from a concerned MES component to said central hub and bounced from said central hub to the other concerned MES components, and said central hub having means for implementing an optimistic/pessimistic read/update mechanism in said central cache.

11. The system according to claim 9, wherein the discrete production line is an automotive assembly line.

12. A non-transitory computer-readable medium having computer executable instructions for performing the steps of method claim 1.

* * * * *